United States Patent [19]

Miyaji et al.

[11] Patent Number: 5,751,810
[45] Date of Patent: May 12, 1998

[54] BIT AGITATOR

[75] Inventors: Atsuko Miyaji, Kawachinagano; Motoji Omori, Osaka; Makoto Tatebayashi, Takarazuka, all of Japan

[73] Assignee: Matsushita Electric Industrial Co., Ltd., Osaka, Japan

[21] Appl. No.: 511,851

[22] Filed: Aug. 7, 1995

[30] Foreign Application Priority Data

Aug. 8, 1994 [JP] Japan ................................ 6-185958

[51] Int. Cl.$^6$ ................................ H04L 9/28; H04L 9/00
[52] U.S. Cl. ................................ 380/28; 380/49
[58] Field of Search ................................ 380/28, 49

[56] References Cited

PUBLICATIONS

"Official Gazette", vol. 1184, Mar. 26, 1996, p. 100.
"Fast Data Encoding Algorithm FEAL", Technical Report by Institute of Electronics and Communication Engineers of Japan (Information Theory), vol. 80, No. 113, IT86–33 pp. 1–6, 1996.

*Primary Examiner*—Thomas H. Tarcza
*Assistant Examiner*—Carmen D. White
*Attorney, Agent, or Firm*—Wenderoth, Lind & Ponack, L.L.P.

[57] ABSTRACT

A 6-digit decimal input value A and a previously prepared 6-digit decimal extension fixed value L are substituted in an extension function f, thereby extending the input value A to a 12-digit decimal value f(A,L). This extended value f(A,L) is bit-agitated with a bit agitation key R. Further, a value C obtained by the bit agitation processing is substituted in a reduction function g, thereby obtaining a 6-digit decimal output value B. Thus, the input value A is extended by the extension processing to be thereafter subjected to the bit agitation processing, whereby safety of secret information can be improved without increasing the number of digits of the input value A. Further, the value obtained by the bit agitation is thereafter reduced, whereby the output value B can be reduced to a number of digits which is applicable to the human memory. Thus, a bit agitator is obtained which is safer than at conventional one and has an excellent user interface.

36 Claims, 8 Drawing Sheets

BIT AGITATOR

BACKGROUND OF THE INVENTION

1. Field of the Invention

The present invention relates to a bit agitator, and more particularly, it relates to a bit agitator for bit-agitating an n-digit decimal input value A for obtaining an m-digit decimal output value B.

2. Background of the Invention

A transmitter which transmits digitized information often agitates the information so that no third party can easily obtain or alter the same, and the receiver returns the agitated information to its original state. In case of personal certification, on the other hand, the certifier transmits certain data to the certified person, so that the certified person presents a value which is obtained by agitating the data with his secret information to the certifier and the certifier also independently obtains the same value through bit agitating the data with the secret information of the certified person. Thus, the personal certification is made when the value presented by the certified person matches the value obtained by the certifier.

A bit agitator is employed for the aforementioned technique. Bit agitation, which is one of secret key communication systems, must be at a high speed with a high agitation rate. In the case of personal certification, it is desired that the inputted data has a length allowing human memorization. Prior art examples for such bit agitation are now described.

(First Prior Art)

Figure 8:
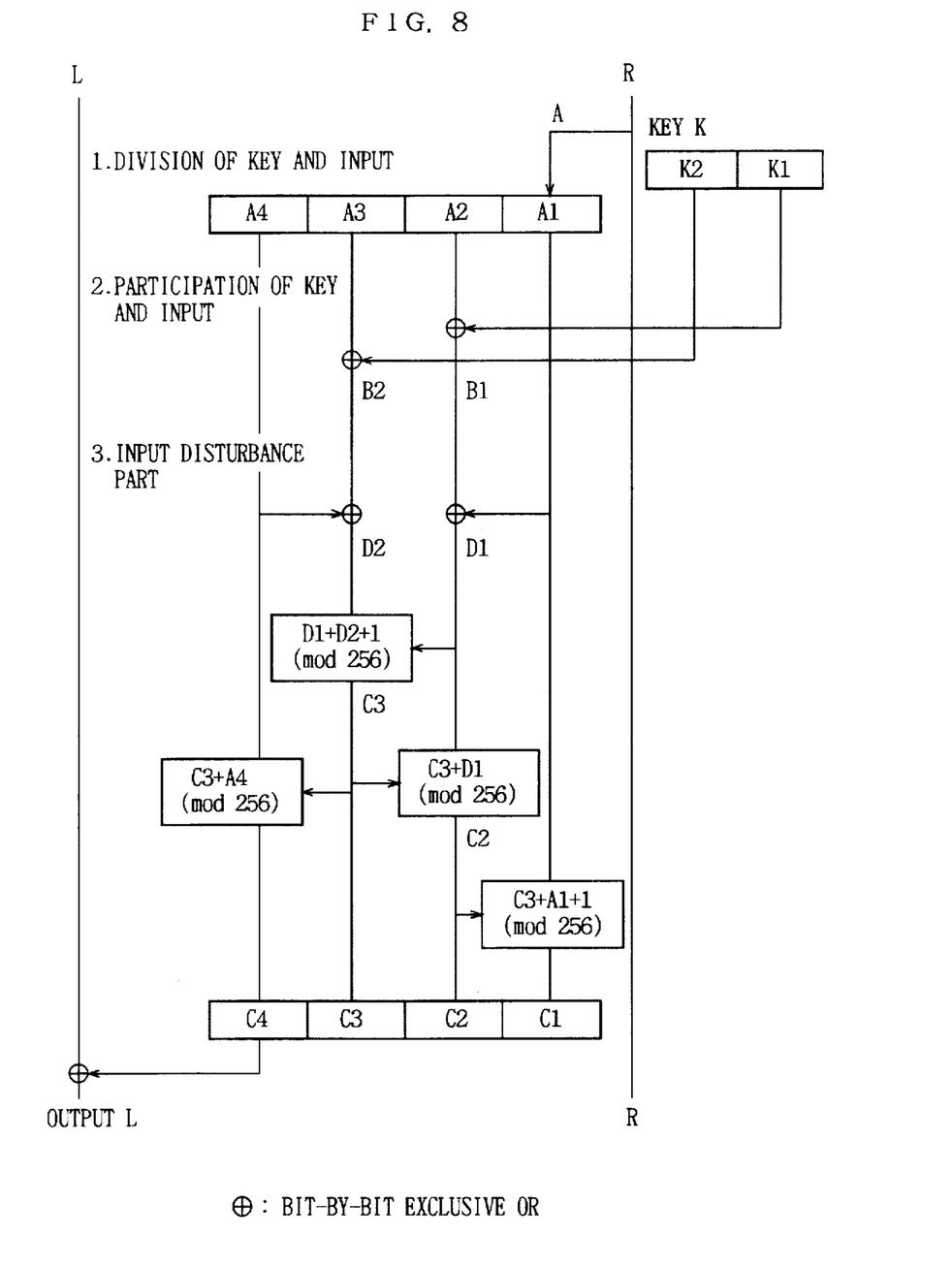
FIG. 8 illustrates an example of conventional bit agitation processing.

The first prior art is a bit agitator called FEAL, which has been developed by Nippon Telegraph and Telephone Company. For further particulars, refer to "Fast Data Encoding Algorithm FEAL", Technical Report by Institute of Electronics and Communication Engineers of Japan (Information Theory), Vol. 80, No. 113, IT86-33, pp. 1 to 6, 1986. FIG. 8 shows a data agitation part of this prior art.

Referring to FIG. 8, the FEAL is a 64-bit input/output bit agitator. In this bit agitator, 32 bits forming the right half of a 64-bit input are inputted in a data disturbance part and encoded so that the bit-by-bit exclusive OR of the result and the left half of the input forms the left half of an output while the right half of the output is formed by the right half of the input. This operation is repeatedly employed. The data disturbance part of the FEAL is now described in more detail.

[1. Division of Key and Input]

It is assumed that K represents a 16-bit key, and A represents a 32-bit input. The key K is divided into two 8-bit blocks K1 and K2, and the input A is divided into four 8-bit blocks A1, A2, A3 and A4.

[2. Participation of Key and Input]

It is assumed that B1 represents the bit-by-bit exclusive OR of the blocks K1 and A2, and B2 represents the bit-by-bit exclusive OR of the blocks K2 and A3.

[3. Input Disturbance Part]It is assumed that D1 represents the bit-by-bit exclusive OR of the blocks B1 and A1, and D2 represents the bit-by-bit exclusive OR of the blocks B2 and A4. A 32-bit output C is divided into four blocks C1, C2, C3 and C4, which are defined as follows respectively:

C3=((D1+D2+1) mod 256)

D2=((C3+D1) mod 256)

C1=((C2+A1+1) mod 256)

C4=((C3+A4) mod 256)

wherein ($\alpha$ mod $\beta$) indicates the remainder obtained by dividing $\alpha$ by $\beta$.

While the FEAL has been developed as a high-speed bit agitator, its data input/output is a 64-bit binary number. Thus, it is difficult for a certified person to input 64-bit data presented by a certifier in the FEAL and to present a 64-bit output value, which is the result of the processing, to the certifier in personal certification or the like, in consideration of an ordinary human memory. Second prior art is now described in relation to an exemplary structure of an agitator having a 6 to 7-digit decimal input/output, for example, in consideration of application of the data input/output to the human memory.

(Second Prior Art)

Figure 9:
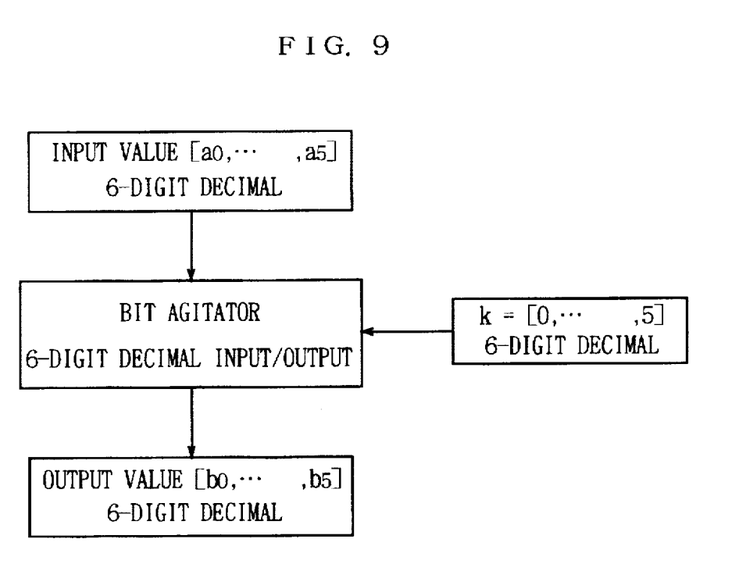
FIG. 9 shows a conventional bit agitator for agitating digitized 6-digit decimal information by a sum with a certain specific value.

FIG. 9 shows a conventional bit agitator for agitating digitized 6-digit decimal information by a sum with a certain specific value. This bit agitator is now described.

Referring to FIG. 9, this bit agitator has an output [$b_0, b_1, b_2, b_3, b_4, b_5$] which is formed by the sum of a 6-digit decimal input [$a_0, a_1, a_2, a_3, a_4, a_5$] and a specific value k=[0, 1, 2, 3, 4, 5] every digit.

The bit agitator shown in FIG. 9 can sufficiently withstand input/output depending on the human memory, as compared with the aforementioned first prior art. However, this agitator has such a problem that the information is easily broken by an exhaustive search method since the data quantity of the key is 106 The exhaustive search method is a breaking method for finding the key by obtaining and listing outputs while fixing an input value and moving all keys. In general, secret information is easily broken by this method in a bit agitator having an easy structure. In order to attain safety, therefore, it is necessary to avoid susceptibility to the exhaustive search method.

SUMMARY OF THE INVENTION

An object of the present invention is to provide a bit agitator which is safer than the conventional one, and has an excellent user interface.

The present invention is directed to a bit agitator which bit-agitates an n-digit decimal input value A ($0 \leq A \leq 10^n - 1$) for obtaining an m-digit decimal output value B ($0 \leq 10^m - 1$). According to the present invention, the input value A and a previously prepared extension fixed value L are substituted in an extension function f so that the input value A is converted to an extended value f(A,L), which in turn is bit-agitated with a bit agitation key. A value C obtained by such bit agitation is substituted in a reduction function g, thereby obtaining the m-digit decimal output value B. Thus, the input value A is extended by extension processing to be thereafter subjected to bit agitation processing, whereby the safety of secret information can be improved without increasing the number of digits of the input value A. Further, the value obtained by the bit agitation is thereafter reduced, whereby the output value B can be reduced to a number of digits which is applicable to the human memory. Thus, it is possible to obtain a bit agitator having higher safety than the conventional one with an excellent user interface.

For example, the input value A is extended to a decimal value f(A,L) ($0 \leq f(A,L) \leq 10^k - 1$) of k digits (k: positive integer greater than n), and the extended value f(A,L) is converted to a k-digit decimal value C ($0 \leq C \leq 10^k - 1$) by bit agitation processing. In this case, a (k−n)-digit decimal value may be employed as the extension fixed value ($0 \leq L \leq 10^{k-n} - 1$) so that a function which is defined by f(A,L)=A+$10^n$L is employed as the extension function f.

Alternatively, a (k−n)-digit decimal value may be employed as the extension fixed value L ($0 \leq L \leq 10^{k-n}-1$) so that a function which is defined by $f(A,L)=A+10^{k-n}A+L$ is employed as the extension function f. On the other hand, a function which is defined by $g(C)=(C \bmod 10^n)$ may be employed as the reduction function g. Alternatively, a function which is defined by $g(C)=[C/10^{k-m}]$ may be employed as the reduction function g.

As another example, the input value A is extended to a binary value f(A,L) of k bits (k: positive integer satisfying the condition of $2^k \geq 10^n$), and the extended value f(A,L) is converted to a k-bit binary value C by bit agitation processing. In this case, an integer satisfying the condition of $0 \leq L \leq 2^k-10^n$ may alternatively be employed as the extension fixed value L, so that a function which is defined by $f(A,L)=A+L$ is employed as the extension function f. On the other hand, a function which is defined by $g(C)=(C \bmod 10^m)$ may be employed as the reduction function g. Alternatively, a value h(C) having a permuted bit position may be obtained by substituting the value C in a bit permutation function h, so that a function which is defined by $g(C)=(h(C) \bmod 10^m)$ is employed as the reduction function g.

The extension fixed value L is preferably stored in a storage means which cannot be read from the exterior of the bit agitator. Thus, safety of the extension fixed value L is ensured.

A part of the bit agitation key is preferably stored in the storage means which cannot be read from the exterior of the bit agitator, so that the remaining part is inputted by the user. Thus, it is possible to obtain a bit agitator which can sufficiently be applied to the user's memory also when the entire bit agitation key has a large number of digits.

It is also possible to build up a personal certification system by generating an input value A and presenting the same to the bit agitator according to the present invention and checking whether or not an output value B which is generated from the input value A by this bit agitator is correct. In this case, the input value A may be generated by a random number generator.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
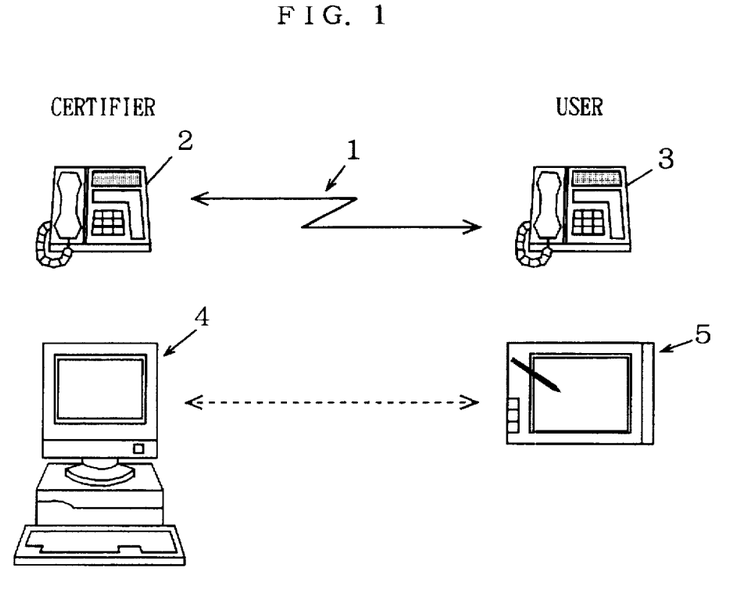
FIG. 1 illustrates an exemplary structure of a personal certification system employing a bit agitator 5 according to an embodiment of the present invention.

FIG. 1 illustrates an exemplary structure of a personal certification system employing a bit agitator 5 according to an embodiment of the present invention. The personal certification system shown in FIG. 1 is employed for business transactions, such as stock transactions or product transactions, for example, requiring personal certification. Referring to FIG. 1, a certifier and each user (certified person) are connected with each other through a telephone line 1, for example. Operators of the certifier and the user achieve data transmission by voice communication through telephone sets 2 and 3.

The certifier has a certification unit 4, which is formed by a computer or the like. On the other hand, the user has the bit agitator 5, which is formed by a computer or the like. The bit agitator 5 is preferably formed by a portable computer, which may be implemented by a notebook type personal computer, a pen-input computer, or an electronic calculator having an additional bit agitational function. While the data transmission is performed by voice communication in this embodiment, the certification unit 4 and the bit agitator 5 may alternatively carry out data transmission online, as shown by a dotted line in FIG. 1.

Figure 2:
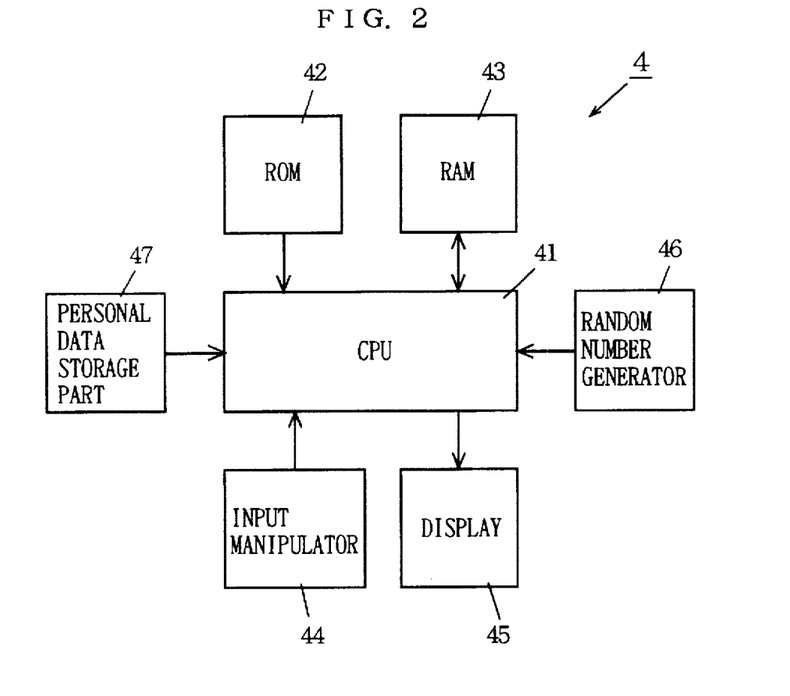
FIG. 2 is a block diagram showing an exemplary structure of a certification unit 4 shown in FIG. 1.

FIG. 2 is a block diagram showing an exemplary structure of the certification unit 4 shown in FIG. 1. Referring to FIG. 2, this certification unit 4 comprises a CPU 41, a ROM 42, a RAM 43, an input manipulator 44, a display 45, a random number generator 46, and a personal data storage part 47. The ROM 42 stores program data, so that the CPU 41 operates in accordance with the program data. The RAM 43 stores various data which are necessary for the operation of the CPU 41. The input manipulator 44 includes a keyboard, a mouse etc. which are manipulated by the operator, and inputs various data and instructions in the CPU 41. The display 45, which is formed by a CRT display or a liquid crystal display, displays image data supplied from the CPU 42. The random number generator 46 generates a random number parameter to be presented to the user. The personal data storage part 47 stores an extension fixed value L and a bit agitation key R corresponding to each identification number which is allotted to each user.

Figure 3:
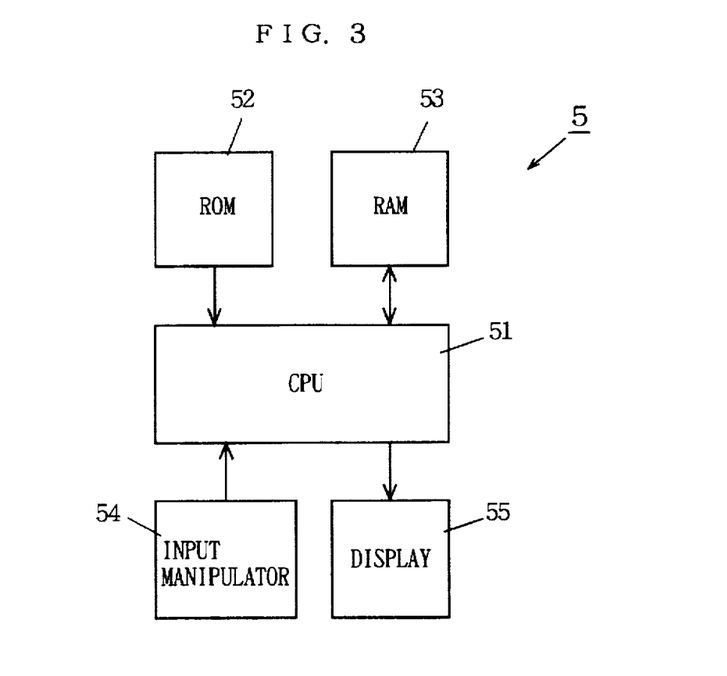
FIG. 3 is a block diagram showing an exemplary structure of the bit agitator 5 shown in FIG. 1.

FIG. 3 is a block diagram showing an exemplary structure of the bit agitator 5 shown in FIG. 1. Referring to FIG. 3, this bit agitator 5 comprises a CPU 51, a ROM 52, a RAM 53, an input manipulator 54, and a display 55. The ROM 52 stores program data, so that the CPU 51 operates in accordance with the program data. The ROM 52 stores an extension fixed value L, which is described later, in a region which cannot be read from the exterior. The RAM 53 stores various data which are necessary for the operation of the CPU 51. The input manipulator 54 includes a keyboard, a mouse etc. which are manipulated by the operator, and inputs various data and instructions in the CPU 51. The display 55, which is formed by a CRT display or a liquid crystal display, displays image data supplied from the CPU 52. The display 55 is an example of an output means for enabling the transmission of an output to the certification unit 4.

Figure 4:
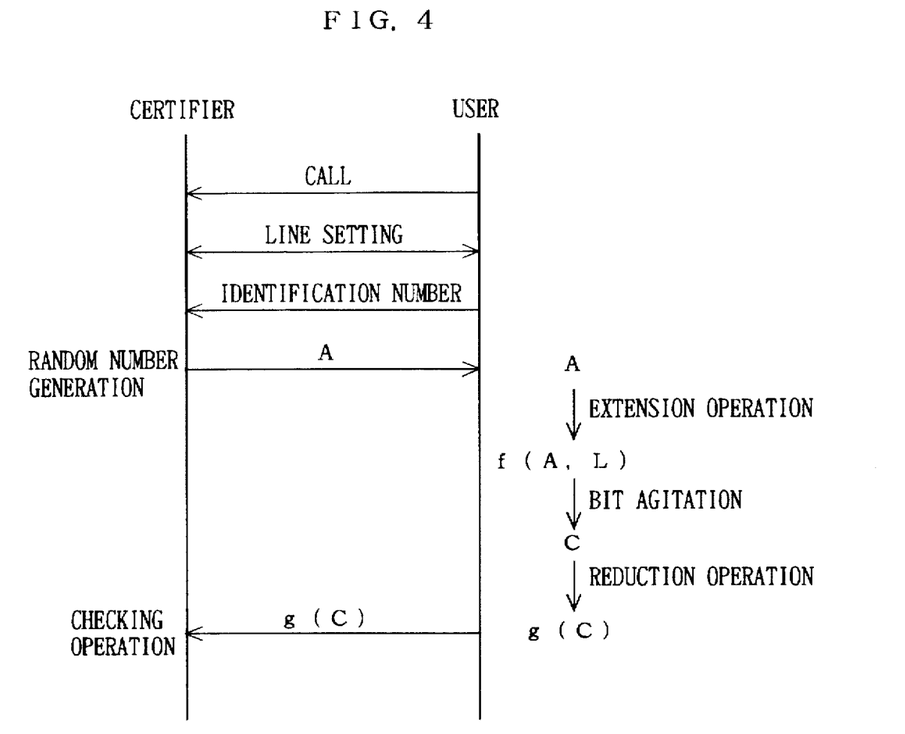
FIG. 4 is a sequence chart showing the operation of the overall personal certification system shown in FIG. 1.
Figure 5:
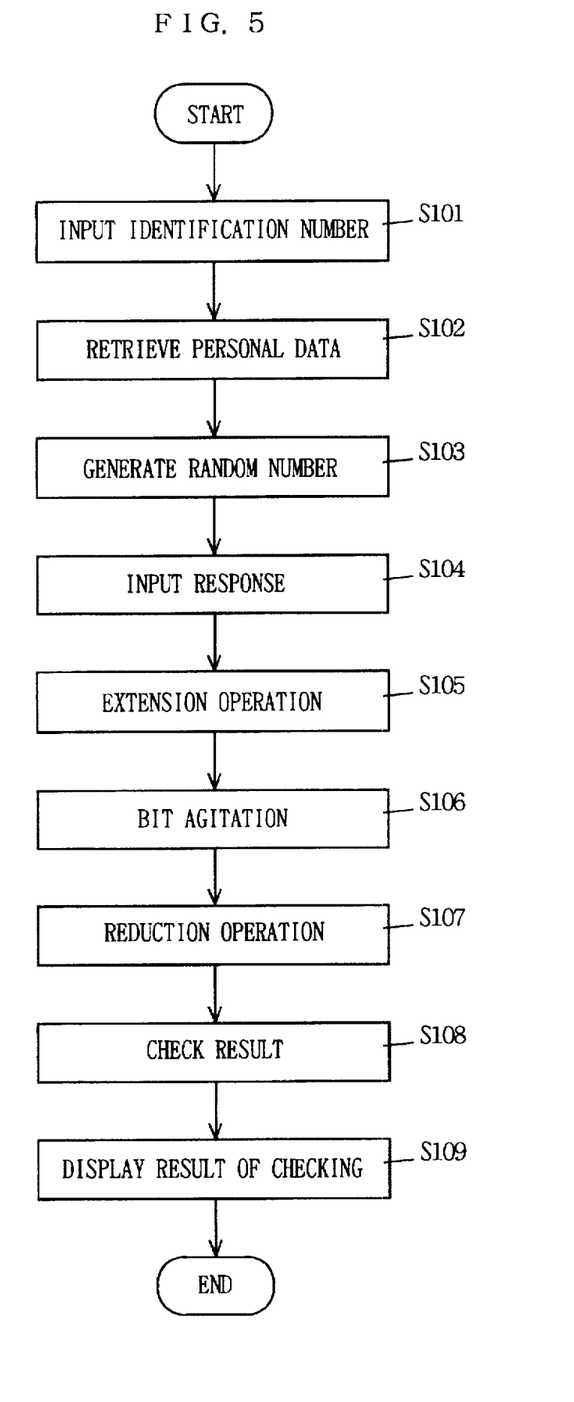
FIG. 5 is a flow chart showing the operation of the certification unit 4 shown in FIG. 1.
Figure 6:
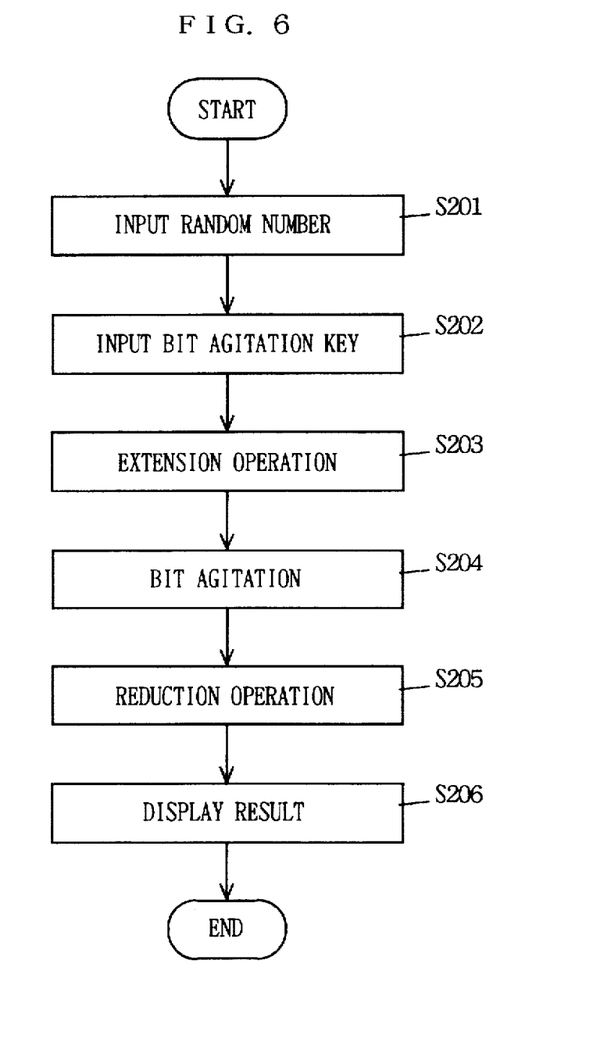
FIG. 6 is a flow chart showing the operation of the bit agitator 5 shown in FIG. 1.

FIG. 4 is a sequence chart showing the operation of the overall personal certification system shown in FIG. 1. FIG. 5 is a flow chart showing the operation of the certification unit 4 shown in FIG. 1. FIG. 6 is a flow chart showing the operation of the bit agitator 5 shown in FIG. 1. The operations of the aforementioned embodiment are now described with reference to FIGS. 4 to 6.

Upon occurrence of data such as business transaction data requiring personal certification, the user first calls the certifier, as shown in FIG. 4. The telephone line 1 is connected between the telephone sets 2 and 3, and the user orally informs the certifier of an identification number which is previously allotted to him through the telephone line 1. The certifier inputs the identification number which is received from the user in the certification unit 4 (step S101 in FIG. 5). Then, the CPU 41 of the certification unit 4 reads corresponding personal data (the extension fixed value L and the bit agitation key R) from the personal data storage part 47 on the basis of the inputted identification number, and temporarily stores the same in the RAM 43 (step S102). Then, the certifier instructs the certification unit 4 to generate a random number. In response to this, the CPU 41 generates a random number parameter A through the random number generator 46 (step S103) . The random number parameter A generated at this time is displayed on the display 45. The certifier orally informs the user of the value of the random number parameter A which is displayed on the display 45 through the telephone line 1.

The user inputs the random number parameter A which is received from the certifier in the bit agitator 5 (step S201 in FIG. 6). Then, the user inputs the bit agitation key R which is allotted to him in the bit agitator 5 (step S202). Each user has his own bit agitation key (or password) which is previously allotted to him, and only the user and the certifier know this bit agitation key. If the number of digits of the bit agitation key is too large, however, a part thereof may be stored in a region of the ROM 52 which cannot be read from the exterior so that the user inputs the remaining part in the bit agitator 5. Then, the CPU 51 of the bit agitator 5 extends the random number parameter A, to increase the number of digits (or the number of bits) (step S203) At this time, the CPU 51 reads the extension fixed value L from the ROM 52 and substitutes this extension fixed value L and the random number parameter A in a predetermined extension function, thereby carrying out an extension operation. The extension fixed value L is preferably varied with the bit agitator in consideration of safety of secret information, while it is difficult to supply different extension fixed values L to all bit agitators in practice. Therefore, the extension fixed values L may be varied with prescribed lots in production of the bit agitators, for example.

Then, the CPU 51 carries out bit agitation processing on the value which is obtained by the extension operation, with the bit agitation key R (step S204). While the bit agitation key R is inputted by the user at the aforementioned step S202, the CPU 51 combines the value which is inputted by the user with a value read from the ROM 52 to obtain the bit agitation key R when the user inputs only a part of the bit agitation key R since the number of digits thereof is too large. Then, the CPU 51 carries out a reduction operation on the bit-agitated data, to reduce the number of digits (or the number of bits) thereof to the same number of digits (number of bits) as the original random number parameter A (step S205). Then, the CPU 51 displays the value which is obtained by the reduction operation on the display 55 (step S206). The user orally informs the certifier of the value which is displayed on the display 55 as a response value.

The certifier inputs the response value which is received from the user in the certification unit 4 (step S104). At this time, the inputted response value is stored in the RAM 43. Then, the CPU 41 of the certification unit 4 executes extension, bit agitation and reduction operations which are similar to those at the steps S203 to S205 of FIG. 6 on the random number parameter A supplied to the user at the aforementioned step S103 (steps S105 to S107). At this time, the CPU 41 executes the extension operation of the step S105 and the bit agitation processing of the step S106 through the extension fixed value L and the bit agitation key R which are read from the personal data storage part 47 at the aforementioned step S102 respectively. Then, the CPU 41 compares the response value which is stored in the RAM 43 at the aforementioned step S104 with the value obtained through the processing at the steps S105 to S107, thereby checking whether or not the values match with each other (step S108). Then, the CPU 41 displays the result of the checking at the step S108 on the display 45 (step S109). The certifier observes the result of the checking which is displayed on the display 45, and determines whether or not personal certification is made for the user. When personal certification is attained for the user, the user thereafter informs the certifier of actual business transaction data such as stock transaction data via voice (or through intercomputer data transmission, as the case may be).

Figure 7:
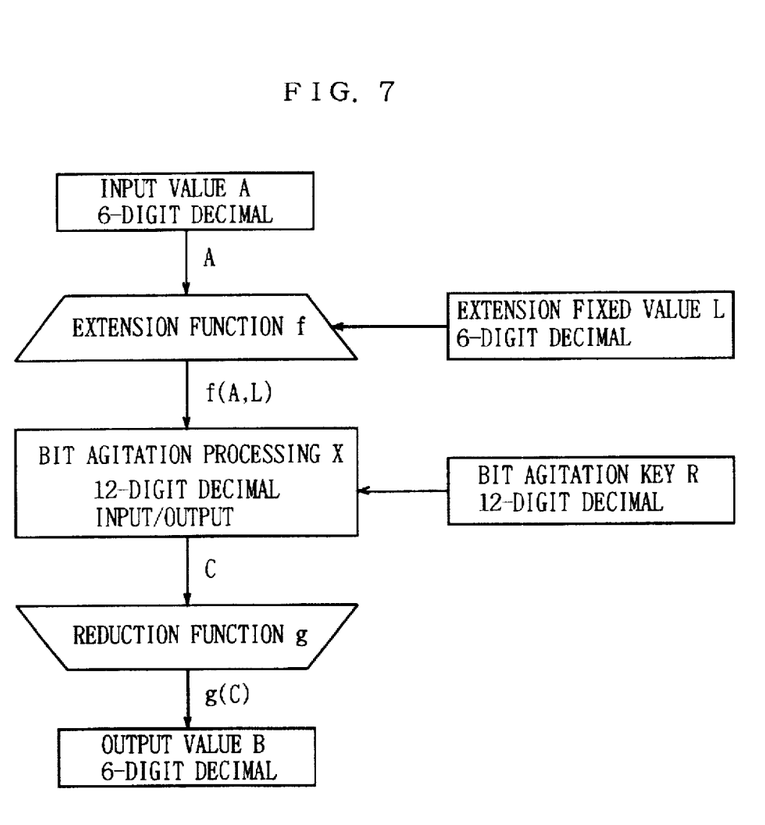
FIG. 7 illustrates exemplary processing for bit agitation executed in steps S203 to S205 shown in FIG. 6.

FIG. 7 shows exemplary processing for bit agitation, which is executed at the aforementioned steps S203 to S205 (or the steps S105 to S107). An exemplary procedure for bit agitation is now described with reference to FIG. 7.

It is assumed here that the input value (random number parameter) A is the following 6-digit decimal value:

$$A=[a_0, a_1, a_2, a_3, a_4, a_5] \ (0 \leq A \leq 10^6-1),$$

the output value (result of reduction operation) B is the following 6-digit decimal number:

$$B=[b_0, b_1, b_2, b_3, b_4, b_5] \ (0 \leq B \leq 10^6-1),$$

the extension fixed value L is the following 6-digit decimal value:

$$L=[l_0, l_1, l_2, l_3, l_4, l_5] \ (0 \leq L \leq 10^6-1)$$

the bit agitation key R is the following 12-digit decimal value:

$$R=[r_0, r_1, \ldots, r_{11}],$$

the extension function f is as follows:

$$f(A,L)=A+10^6 L$$

and the reduction function g is as follows:

$$G(C)=(C \bmod 10^6)$$

The input value A is substituted in the extension function f with the extension fixed value L, so that the result f(A,L) is inputted in bit agitation processing X which is prepared by extending an existent 6-bit agitator to 12-digit input/output. The processing result C is substituted in the reduction function g, so that the output value B is formed by the result g(C).

In the bit agitator 5 having the aforementioned structure, the user uses a 6-digit decimal input/output part, which is in the range sufficiently applicable to the human memory.

Safety of the bit agitator 5 having the aforementioned structure mainly depends on the bit agitation processing X. When the bit agitation processing X is so formed that the same cannot be broken by a method other than that by an exhaustive search method requiring $10^{12}$ operation times, the breaking method for the bit agitator 5 having the aforementioned extension requires $10^{12} \times 10^6$ operation times, whereby stronger safety of secret information can be maintained as compared with the case of employing a bit agitator of only 12-digit input/output.

As hereinabove described, the bit agitator 5 according to this embodiment can maintain sufficient safety by extending an existent bit agitator while suppressing the number of digits of input/output corresponding to the user interface to a 6-digit decimal number in the range applicable to the human memory.

While the above embodiment has been described with reference to a case where the input value A and the output value B are equal in number of digits to each other, the present invention is also applicable to such case that input and output values have different numbers of digits.

In the aforementioned embodiment, the following extension function f is employed:

$$f(A,L)=A+10^6 L$$

while this function is generalized and described as follows:

$$F(A,L)=A+10^n L$$

where n represents the number of digits of the input value A. Alternatively, this may be replaced by a function which is defined as follows:

$$F(A,L)=10^{k-n}A+L$$

where k represents the number of digits of the result f(A,L) of the extension operation, and k>n.

In the aforementioned embodiment, further, the following reduction function g is employed:

$$g(C)=(C \bmod 10^6)$$

while this function is generalized and described as follows:

$$g(C)=(C \bmod 10^m)$$

Alternatively, this may be replaced by a function which is defined as follows:

$$g(C)=\lfloor C/10^{k-m} \rfloor$$

where $\lfloor C/10^{k-m} \rfloor$ represents the quotient obtained by dividing C by $10^{k-m}$.

While the above embodiment has been described with reference to the case of executing the extension operation, the bit agitation processing and the reduction operation in the decimal states for easy understanding of the present invention, these arithmetic operations may alternatively be carried out in binary states since a computer generally treats arithmetic operations with binary numbers. In this case, the n-digit decimal input value A is substituted in the extension function f with the extension fixed value L, and extended to k-bit binary data. At this time, k represents a positive integer satisfying the condition of $2^k \geq 10^n$, and the extension fixed value L is an integer satisfying the condition of $0 \leq L \leq 2^k - 10^n$. The extension function f is formed by a function which is defined as follows, for example:

$$F(A,L)=A+L$$

The bit agitation processing is prepared from that of k-bit input/output. Further, the reduction function g is formed by a function which is defined as follows, for example:

$$G(C)=(C \bmod 10^m)$$

After the bit agitation processing, processing of substituting the value C in a bit permutation function h thereby obtaining a value C' having a permuted bit position may be added in advance of the reduction operation. In this case, the reduction function g is formed by a function which is defined as follows, for example:

$$G(C)=(h(C) \bmod 10^m)$$

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A bit agitator for bit-agitating an n-digit decimal input value A ($0 \leq A \leq 10^n - 1$) thereby obtaining an m-digit decimal output value B ($0 < B < 10^m - 1$), said bit agitator comprising:

a central processing unit, an input means for inputting said input value A to said central processing unit;

extension means for converting said input value A to an extended value f(A,L) by substituting said input value A and a previously prepared extension fixed value L in an extension function f;

bit agitation means for obtaining a value C by bit-agitating said extended value f(A,L) being obtained by said extension means, with a bit agitation key;

reduction means for obtaining said m-digit decimal output value B by substituting said value C in a reduction function g; and output means for enabling the transmission of said m-digit decimal output value B to a certification unit for comparison with a certification response value.

2. The bit agitator in accordance with claim 1, wherein said extension means converts said input value A to said extended value f(A/L) which is a decimal value of k digits, k being a positive integer greater than n ($0 \leq f(A,L) \leq 10^k - 1$); and said bit agitation means bit-agitates said extended value f(A,L) to obtain said value C which is a k-digital decimal value ($0 \leq C \leq 10^k - 1$).

3. A bit agitator in accordance with claim 2, wherein said extension fixed value L is a (k–n)-digital decimal value ($0 \leq L \leq 10^{k-n} - 1$); and a function defined by:

$$f(A,L)=A+10^n L$$

is employed as said extension function f.

4. The bit agitator in accordance with claim 2, wherein said extension fixed value L is a (k–n)-digital decimal value ($0 \leq L \leq 10^{k-n} - 1$); and a function defined by:

$$f(A,L)=10^{k-n}A+L$$

is employed as said extension function f.

5. The bit agitator in accordance with claim 2, wherein a function defined by:

$$g(C)=(C \bmod 10^m)$$

where (C mod $10^m$) represents the remainder obtained by dividing C by $10^m$, is employed as said reduction function g.

6. The bit agitator in accordance with claim 3, wherein a function defined by:

$$g(C)=(C \bmod 10^m)$$

where (C mod $10^m$) represents the remainder obtained by dividing C by $10^m$, is employed as said reduction function g.

7. The bit agitator in accordance with claim 4, wherein a function defined by:

$$g(C)=(C \bmod 10^m)$$

where $(C \bmod 10^m)$ represents the remainder obtained by dividing C by $10^m$, is employed as said reduction function g.

8. The bit agitator in accordance with claim 2, wherein a function defined by:

$$g(C)=[C/10^{k-m}]$$

where $[C/10^{k-m}]$ represents the quotient obtained by dividing C by $10^{k-m}$, is employed as said reduction function g.

9. The bit agitator in accordance with claim 3, wherein a function defined by:

$$g(C)=[C/10^{k-m}]$$

where $[C/10^{k-m}]$ represents the quotient obtained by dividing C by $10^{k-m}$, is employed as said reduction function g.

10. The bit agitator in accordance with claim 4, wherein a function defined by:

$$g(C)=[C/10^{k-m}]$$

where $[C/10^{k-m}]$ represents the quotient obtained by dividing C by $10^{k-m}$, is employed as said reduction function g.

11. The bit agitator in accordance with claim 1, wherein said extension means converts said input value A to said extended value f(A,L) which is a binary value of k bits, k being a positive integer satisfying the condition of $2^k \geq 10^n$; and said bit agitation means bit-agitates said extended value f(A,L) to obtain said value C which is a k-bit binary value.

12. The bit agitator in accordance with claim 11, wherein said extension fixed value L is an integer satisfying the condition of $0 \leq L \leq 2^k - 10^n$; and a function defined by:

$$f(A,L)=A+L$$

is employed as said extension function f.

13. The bit agitator in accordance with claim 11, wherein a function defined by:

$$g(C)=(C \bmod 10^m)$$

where $(C \bmod 10^m)$ represents the remainder obtained by dividing C by $10^m$, is employed as said reduction function g.

14. The bit agitator in accordance with claim 12, wherein a function defined by:

$$g(C)=(C \bmod 10^m)$$

where $(C \bmod 10_m)$ represents the remainder obtained by dividing C by $10^m$, is employed as said reduction function g.

15. The bit agitator in accordance with claim 11, further comprising bit permutation means for obtaining a value h(C) having a permuted bit position by substituting said value C in a bit permutation function h; and a function defined by:

$$g(C)=(h(C) \bmod 10^m)$$

where $(h(C) \bmod 10^m)$ represents the remainder obtained by dividing the value h(C) by $10^m$, is employed as said reduction function g.

16. The bit agitator in accordance with claim 12, further comprising bit permutation means for obtaining a value h(C) having a permuted bit position by substituting said value C i a bit permutation function h; and a function defined by:

$$g(C)=h(C) \bmod 10^m)$$

where $h(C) \bmod 10^m$ represents the remainder obtained by dividing the value h(C) by $10^m$, is employed as said reduction function g.

17. The bit agitator in accordance with claim 1, further comprising storage means for storing data;

wherein said extension fixed value L is stored in a region of said storage means which cannot be read from the exterior of said bit agitator.

18. The bit agitator in accordance with claim 1, further comprising storage means for storing data;

wherein a part of said bit agitation key is stored in a region of said storage means which cannot be read from the exterior of said bit agitator and a remaining part of said bit agitation key is input by a user.

19. A transmitting/receiving system, wherein a transmitter agitates an input value and then transmits the result to a receiver comprising:

a bit agitator for bit-agitating an n-digit decimal input value A ($0 \leq A \leq 10^n - 1$) thereby obtaining a m-digit decimal output value B ($0 \leq B \leq 10^m - 1$);

transmitting means for transmitting the output value B agitated by said bit agitator; and receiving means for receiving said output value B transmitted from said transmitting means;

wherein said bit agitator comprises;

extension means for converting said input value A to an extended value f(A,L) by substituting said input value A and a previously prepared extension fixed value L in an extension function f;

bit agitation means for obtaining a value C by bit-agitating said extended value f(A,L) being obtained by said extension means with a bit agitation key; and reduction means for obtaining said m-digit decimal output value B by substituting said value C in a reduction function g.

20. The transmitting/receiving system in accordance with claim 19, wherein said extension means converts said input value A to said extended value f(A/L) which is a decimal value of k digits, k being a positive integer greater than n ($0 \leq f(A,L) \leq 10^k - 1$); and said bit agitation means bit-agitates said extended value f(A,L) to obtain said value C which is a k-digit decimal value ($0 \leq C \leq 10^k - 1$).

21. The transmitting/receiving system in accordance with claim 2, wherein said extension fixed value L is a (k−n)-digit decimal value ($0 \leq L \leq 10^{k-n-1}$); and a function defined by:

$$f(A,L)=A+10^n L$$

is employed as aid extension function f.

22. The transmitting/receiving system in accordance with claim 20, wherein said extension fixed value L is a (k−n)-digit decimal value ($0 \leq L \leq 10^{k-n} - 1$); and a function defined by:

$$f(A,L)=10^{k-n}A+L$$

is employed as said extension function f.

23. The transmitting/receiving system in accordance with claim 20, wherein a function defined by:

$$g(C)=(C \bmod 10^m)$$

where $(C \bmod 10^m)$ represents the remainder obtained by dividing C by $10^m$, is employed as said reduction function g.

24. The transmitting/receiving system in accordance with claim 21, wherein a function defined by:

$$g(C)=(C \bmod 10^m)$$

where $(C \bmod 10^m)$ represents the remainder obtained by dividing C by $10^m$, is employed as said reduction function g.

25. The transmitting/receiving system in accordance with claim 22, wherein a function defined by:

$$g(C)=(C \bmod 10^m)$$

where $(C \bmod 10^m)$ represents the remainder obtained b dividing C by $10^m$, is employed as said reduction function g.

26. The transmitting/receiving system in accordance with claim 20, wherein a function defined by:

$$g(C)=(C/10^{k-m})$$

wherein $(C/10^{k-m})$ represents the quotient obtained by dividing C by $10^{k-m}$, is employed as said reduction function g.

27. The transmitting/receiving system in accordance with claim 21, wherein a function defined by:

$$g(C)=(C/10^{k-m})$$

where $(C/10^{k-m})$ represents the quotient obtained by dividing C by $10^{k-m}$, is employed as said reduction function g.

28. The transmitting/receiving system in accordance with claim 22, wherein a function defined by:

$$g(C)=(C/10^{k-m})$$

where $(C/10^{k-m})$ represents the quotient obtained by division C by $10^{k-m}$, is employed as said reduction function g.

29. The transmitting/receiving system in accordance with claim 19, wherein said extension means converts said input value A to said extended value f(A,L) which is a binary value of k bits, k being a positive integer satisfying the condition of $2^k \geq 10^n$; and said bit agitation means bit-agitates said extended value f(A,L) to obtain said value C which is a k-bit binary value.

30. The transmitting/receiving system in accordance with claim 29, wherein said extension fixed value L is an integer satisfying the condition of $0 \leq L \leq 2^k - 10^n$; and a function defined by:

$$f(A,L)=A+L$$

is employed as said extension function f.

31. The transmitting/receiving system in accordance with claim 29, wherein a function defined by:

$$g(C)=(C \bmod 10^m)$$

where $(C \bmod 10^m)$ represents the remainder obtained by division C by $10^m$, is employed as said reduction function g.

32. The transmitting/receiving system in accordance with claim 30, wherein a function defined by:

$$g(C)=(C \bmod 10^m)$$

where $(C \bmod 10^m)$ represents the remainder obtained by dividing C by $10^m$, is employed as said reduction function g.

33. The transmitting/receiving system in accordance with claim 29, further comprising bit permutation means for obtaining a value h(C) having a permuted bit position by substituting said value C in a bit permutation function h; and a function defined by:

$$g(C)=(h(C) \bmod 10^m)$$

where $(h(C) \bmod 10^m)$ represents the remainder obtained by dividing the value h(C) by $10^m$, is employed as said reduction function g.

34. The transmitting/receiving system in accordance with claim 30, further comprising bit permutation means for obtaining a value h(C) having a permuted bit position by substituting said value C in a bit permutation function h; and a function defined by:

$$g(C)=(h(C) \bmod 10^m)$$

where $(h(C) \bmod 10^m)$ represents the remainder obtained by dividing the value h(C) by $10^m$, is employed as said reduction function g.

35. The transmitting/receiving system in accordance with claim 19, further comprising storage means for storing data;

wherein said extension fixed value L is stored in a region of said storage means which cannot be read from the exterior of said bit agitator.

36. The transmitting/receiving system in accordance with claim 19, further comprising storage means for storing data;

wherein a part of said bit agitation key is stored in a region of said storage means which cannot be read from the exterior of said bit agitator and a remaining part of said bit agitation key is input by a user.

* * * * *